(12) United States Patent  
Ren et al.

(10) Patent No.: US 12,439,343 B2  
(45) Date of Patent: Oct. 7, 2025

(54) UPLINK POWER CONTROL FOR CROSS-LINK INTERFERENCE SCENARIOS

(71) Applicant: QUALCOMM Incorporated, San Diego, CA (US)

(72) Inventors: Yuwei Ren, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 17/757,813

(22) PCT Filed: Jan. 13, 2020

(86) PCT No.: PCT/CN2020/071694
§ 371 (c)(1),
(2) Date: Jun. 21, 2022

(87) PCT Pub. No.: WO2021/142568
PCT Pub. Date: Jul. 22, 2021

(65) Prior Publication Data
US 2023/0164698 A1  May 25, 2023

(51) Int. Cl.
*H04W 52/14* (2009.01)
*H04W 52/24* (2009.01)

(52) U.S. Cl.
CPC ....... *H04W 52/146* (2013.01); *H04W 52/244* (2013.01)

(58) Field of Classification Search
CPC ............. H04W 52/146; H04W 52/244; H04W 52/242; H04W 52/245; H04W 52/262;
(Continued)

(56) References Cited

U.S. PATENT DOCUMENTS

2018/0205427 A1  7/2018  Ghosh et al.
2021/0112503 A1*  4/2021  Zhang ............... H04W 24/08

FOREIGN PATENT DOCUMENTS

CN  109391973 A  2/2019
CN  110447272 A  11/2019
(Continued)

OTHER PUBLICATIONS

SAMSUNG: "Cross-link Interference Management Based on Power Control", 3GPP TSG RAN WG1 Meeting#90, R1-1714508, 3GPP, Mobile Competence Centre, 650, Route Des Lucioles, F-06921 Sophia-Antipolis Cedex, France, vol. RAN WG1, Prague, Czech Republic, Aug. 21, 2017-Aug. 25, 2017, 6pp, XP051261569. (Year: 2017).*

(Continued)

*Primary Examiner* — Angelica Perez
(74) *Attorney, Agent, or Firm* — Harrity & Harrity LLP/Qualcomm Incorporated

(57) ABSTRACT

Various aspects of the present disclosure generally relate to wireless communication. In some aspects, a first user equipment (UE) may receive, from a second UE, cross-link interference information identifying a cross-link interference strength at the second UE; determine an uplink transmit power based at least in part on the cross-link interference strength at the second UE; and transmit, on an uplink, using the determined uplink transmit power. Numerous other aspects are provided.

32 Claims, 8 Drawing Sheets

(58) Field of Classification Search
CPC ..... H04W 52/24; Y02D 30/70; H04B 17/345; H04B 17/318
See application file for complete search history.

(56) References Cited

FOREIGN PATENT DOCUMENTS

| EP | 3592024 A1 | 1/2020 |
|---|---|---|
| WO | 2018120065 A1 | 7/2018 |
| WO | 2018126448 A1 | 7/2018 |
| WO | 2018127100 A1 | 7/2018 |
| WO | 2019141036 A1 | 7/2019 |

OTHER PUBLICATIONS

Nokia, et al: On Cross-link Interference Measurement Framework, 3GPP Draft, 3GPP TSG RAN WG1 NR Ad-hoc #3, R1-1715747, 3GPP, Mobile Competence Centre, 650, Route Des Lucioles, F-06921 Sophia-Antipolis Cedex, vol. RAN WG1, Nagoya, Japan, Sep. 18, 2017-Sep. 21, 2017, XP051339209, 6 pages. (Year: 2017).*

Huawai, et al., "On CLI Measurement and Power Control for Cross-link Interference Mitigation", 3GPP TSG RAN WG1 Meeting #88bis, R1-1704255, Apr. 7, 2017 (Apr. 7, 2017), 7 pages, section 2.3.

International Search Report and Written Opinion—PCT/CN2020/071694—ISA/EPO—Jun. 30, 2020.

Huawei, et al., "UL Power Control for Cross-link Interference Mitigation", 3GPP TSG RAN WG1 Meeting #89, R1-1706912, 3rd Generation Partnership Project, Mobile Competence Centre, 650, Route Des Lucioles, F-06921 Sophia-Antipolis Cedex, France, vol. RAN WG1, No. Hangzhou, China, May 15, 2017-May 19, 2017, May 6, 2017, 6 Pages, XP051261569, Section 2.2, p. 3-4.

Samsung: "Cross-link Interference Management Based on Power Control", 3GPP TSG RAN WG1 Meeting #90, R1-1714508, 3rd Generation Partnership Project, Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017, 5 pages, XP051317284, Section 2.2, p. 3, Section 2, p. 1.

Supplementary European Search Report—EP20914248—Search Authority—The Hague—Sep. 12, 2023.

Huawei, et al., "UL Power Control for Cross-Link Interference Mitigation," 3GPP TSG RAN WG1 Meeting NR#3, R1-1715424, Sep. 18-21, 2017 (Sep. 21, 2017), 7 pages, the whole document.

Samsung: "Cross-link Interference Management Based on Power Control", 3GPP TSG RAN WG1 Meeting #90, R1-1714508, Prague, Czech Republic, Aug. 21-25, 2017, pp. 1-5.

* cited by examiner

UPLINK POWER CONTROL FOR CROSS-LINK INTERFERENCE SCENARIOS

CROSS-REFERENCE TO RELATED APPLICATION

This Patent application claims priority to Patent Cooperation Treaty (PCT) Patent Application No. PCT/CN2020/071694, filed on Jan. 13, 2020, entitled "UPLINK POWER CONTROL FOR CROSS-LINK INTERFERENCE SCENARIOS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink power control for cross-link interference scenarios.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a first user equipment (UE), may include receive, from a second UE, cross-link interference information identifying a cross-link interference strength at the second UE; determine an uplink transmit power based at least in part on the cross-link interference strength at the second UE; and transmit, on an uplink, using the uplink transmit power based at least in part on determining the uplink transmit power.

In some aspects, a first UE for wireless communication may include memory and one or more processors operatively coupled to the memory. The memory and the one or more processors may be configured to receive, from a second UE, cross-link interference information identifying a cross-link interference strength at the second UE; determine an uplink transmit power based at least in part on the cross-link interference strength at the second UE; and transmit, on an uplink, using the determined uplink transmit power.

In some aspects, a non-transitory computer-readable medium may store one or more instructions for wireless communication. The one or more instructions, when executed by one or more processors of a first UE, may cause the one or more processors to receive, from a second UE, cross-link interference information identifying a cross-link interference strength at the second UE; determine an uplink transmit power based at least in part on the cross-link interference strength at the second UE; and transmit, on an uplink, using the determined uplink transmit power.

In some aspects, an apparatus for wireless communication may include means for receiving, from a second UE, cross-link interference information identifying a cross-link interference strength at the second UE; means for determining an uplink transmit power based at least in part on the cross-link interference strength at the second UE; and means for transmitting, on an uplink, using the determined uplink transmit power.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
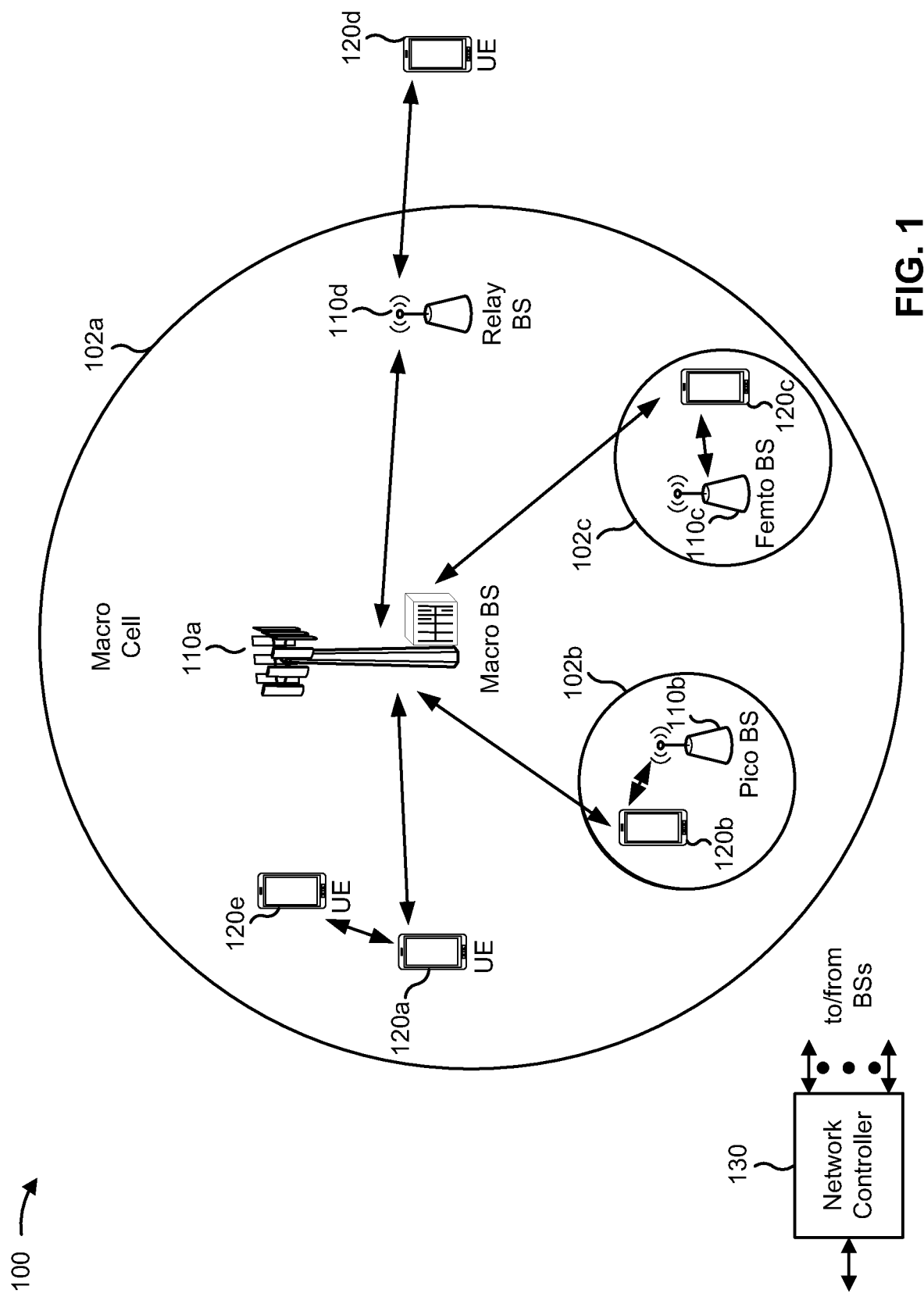
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. In some aspects, the one or more sidelink channels may include a physical sidelink control channel (PSCCH) that two or more UEs 120 may use to communicate control information, a physical sidelink feedback channel (PSFCH) that two or more UEs 120 may use to communicate feedback information (e.g., hybrid automatic repeat request (HARQ) feedback to provide an acknowledgement (ACK) or a negative acknowledgement (NACK) for a scheduled sidelink transmission), a physical sidelink shared channel (PSSCH) that two or more UEs 120 may use to transmit data, and/or the like. Furthermore, in some aspects, communication over the one or more sidelink channels may occur over a carrier that is shared with a Uu interface between a UE 120 and a base station 110, dedicated to sidelink communications, and/or the like. In some aspects, the carrier to be used for the sidelink communications may be configured by a base station 110 or by the UE 120 that performs scheduling operations, resource selection operations, and/or the like. In some aspects, communication over the one or more sidelink channels may include unsupervised transmissions and/or unicast transmissions that are supervised by a base station 110.

As indicated above, FIG. 1 is provided as an example. Other examples may differ from what is described with regard to FIG. 1.

Figure 2:
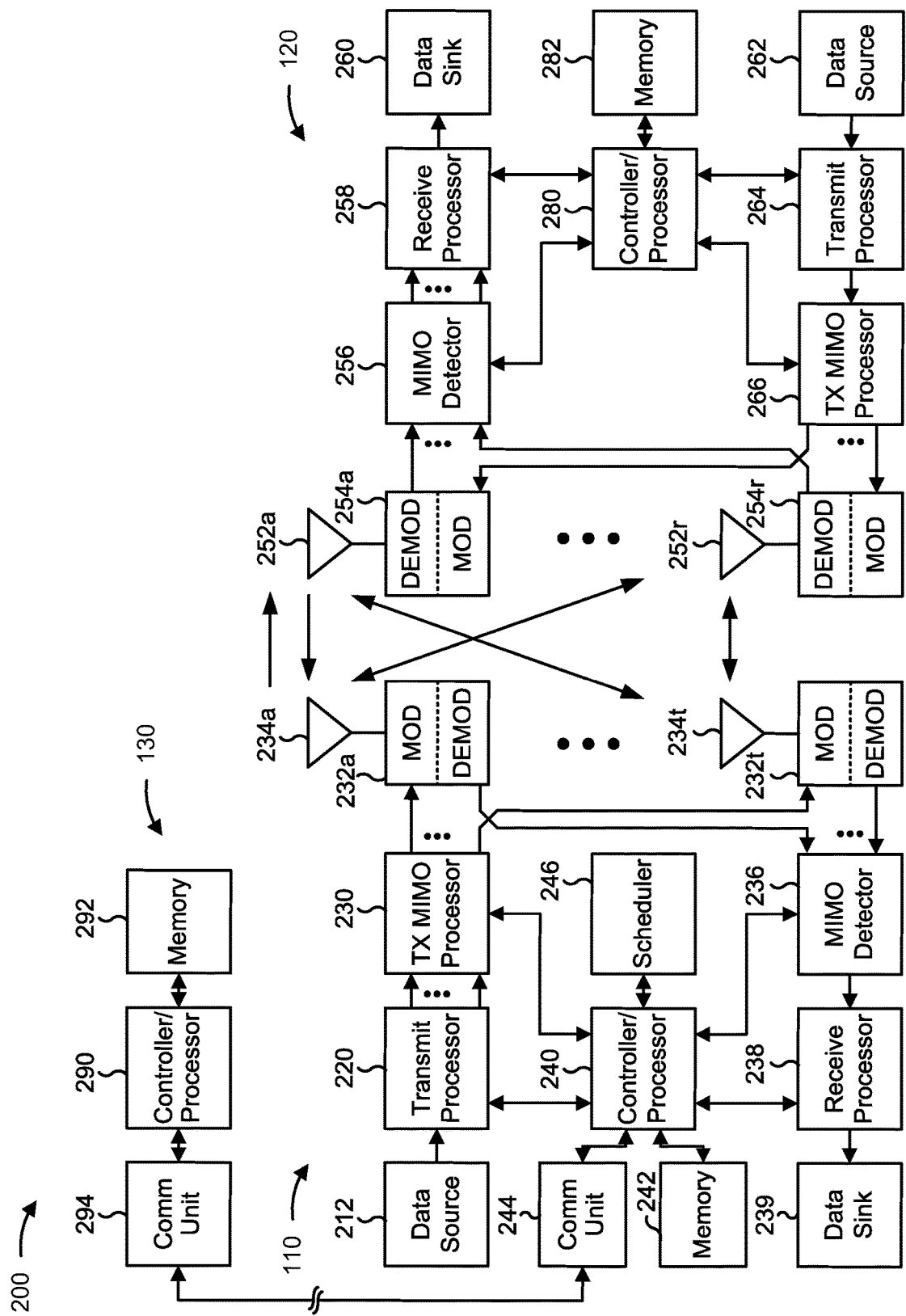
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with uplink power control for cross-link interference in sidelink communication scenarios, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. As such, memory 282 of the UE can comprise a non-transitory computer-readable medium storing one or more instructions for wireless communication, where the one or more instructions comprise one or more instructions that, when executed by one or more processors (e.g., processor 258 and/or controller/processor 280) of the UE 120, cause the one or more processors to perform the method described in greater detail with reference to FIGS. 4A-4C and 5. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, UE 120 illustrated in FIG. 2 can include a first UE, as described further below. The first UE may include means for receiving (e.g., using antenna 252, DEMOD 254, MIMO detector 256, receive processor 258, controller/processor 280, memory 282, and/or the like), from a second UE, cross-link interference information identifying a cross-link interference strength at the second UE 120-2; means for determining (e.g., using controller/processor 280, transmit processor 264, TX MIMO processor 266, MOD 254, antenna 252, and/or the like) an uplink transmit power based at least in part on the cross-link interference strength at the second UE 120-2; means for transmitting (e.g., using controller/processor 280, transmit processor 264, TX MIMO processor 266, MOD 254, antenna 252, and/or the like), on an uplink, using the determined uplink transmit power; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. UE 120 can also include a second UE, as described elsewhere herein.

As indicated above, FIG. 2 is provided as an example. Other examples may differ from what is described with regard to FIG. 2.

Figure 3A:
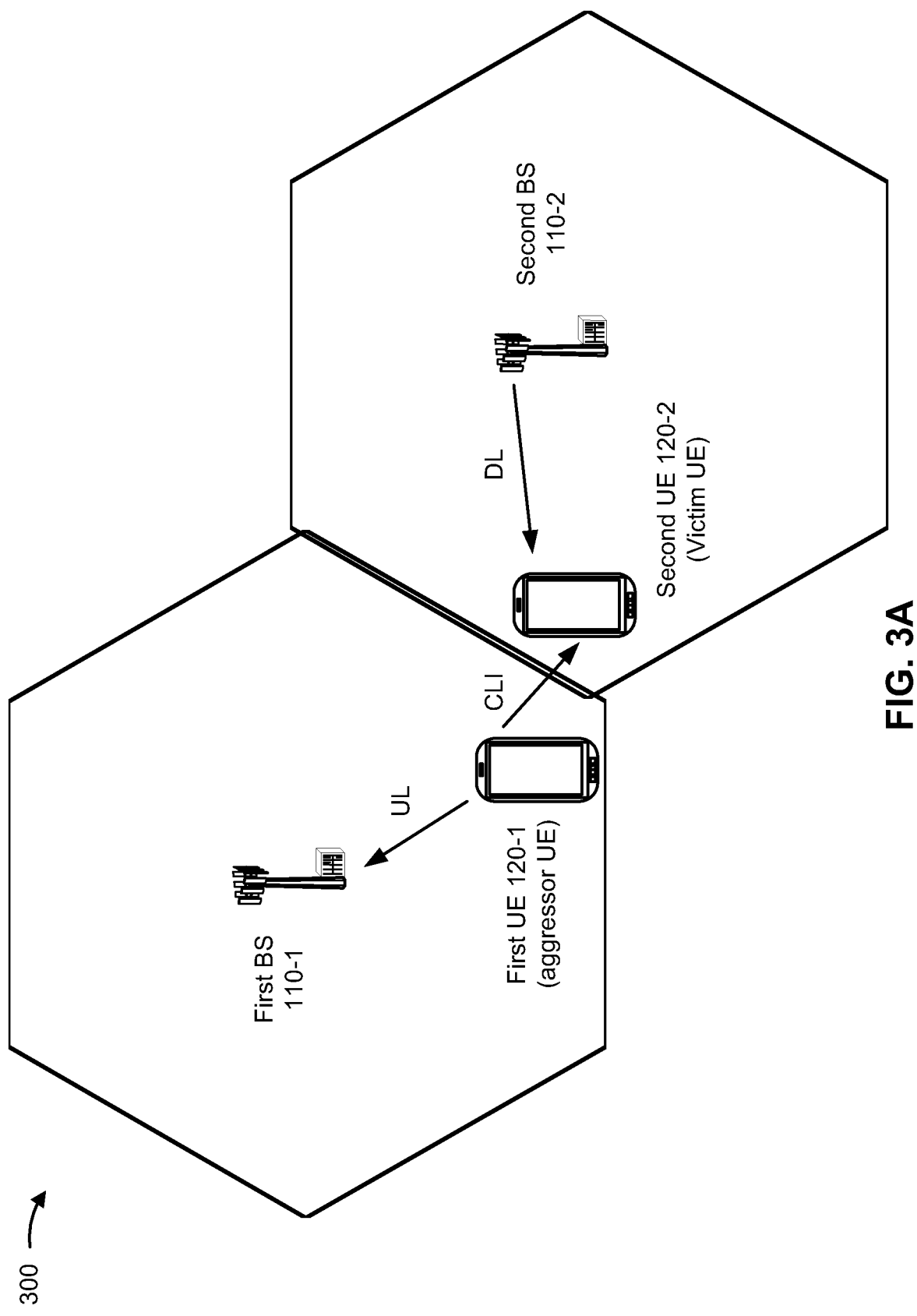
FIGS. 3A and 3B are diagrams illustrating examples of cross-link interference in sidelink communication scenarios, in accordance with various aspects of the present disclosure.
Figure 3B:
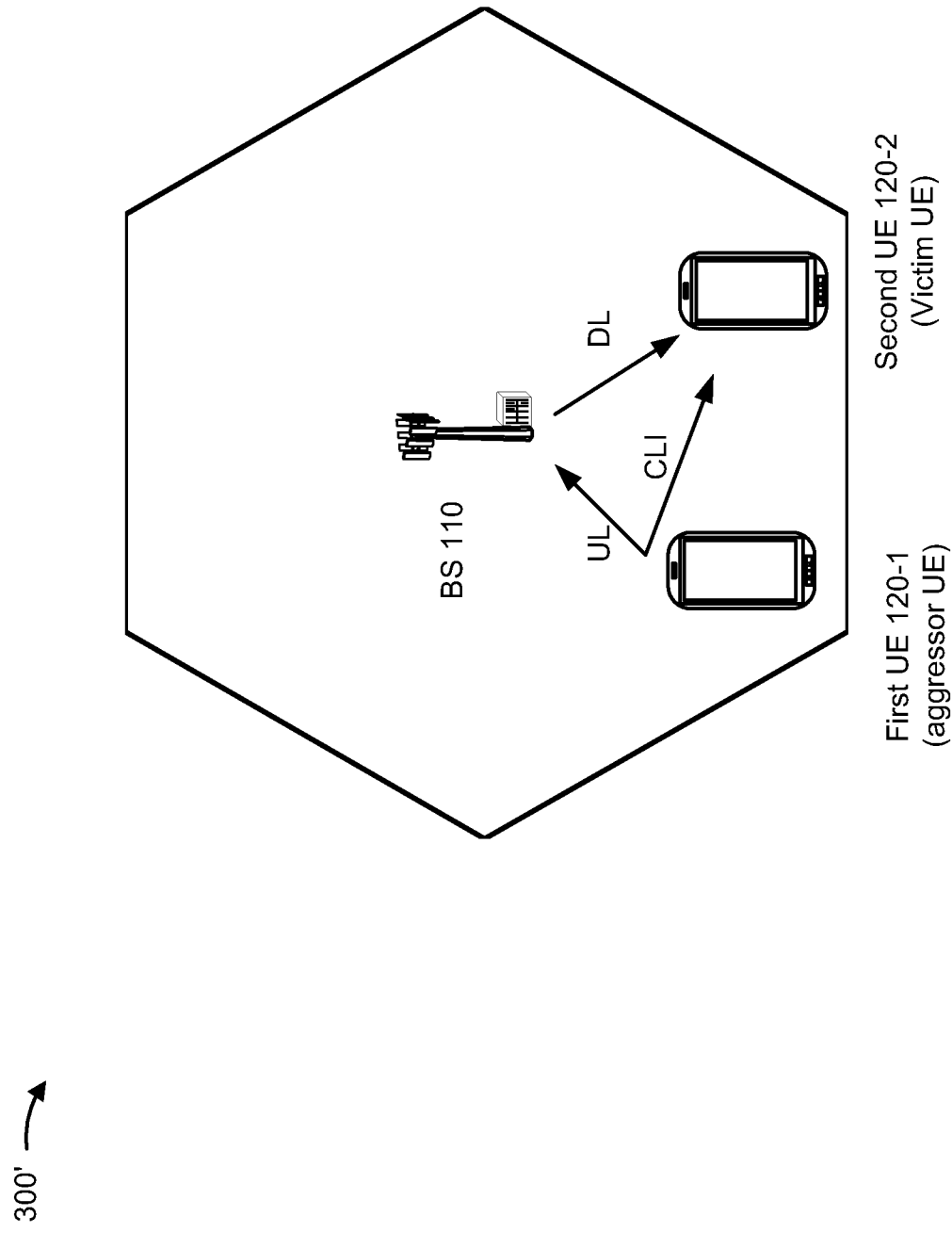

FIGS. 3A and 3B are diagrams illustrating examples 300/300' of cross-link interference in sidelink communication scenarios, in accordance with various aspects of the present disclosure.

As shown in FIG. 3A, in a first scenario, a first BS 110-1 may provide a first cell that includes a first UE 120-1-1 and a second BS 110-2 may provide a second cell, which neighbors the first cell, that includes a second UE 120-2. In some cases, dynamic time division duplexing (TDD) may result in UE to UE cross-link interference (CLI). For example, when first UE 120-1 transmit an uplink (UL) transmission on an uplink symbol in the first cell, the uplink transmission may collide with a downlink (DL) transmission on a downlink symbol in the second cell. In this case, first UE 120-1 may be termed an aggressor UE, which causes the cross-link interference and second UE 120-2 may termed a victim UE, which experiences the cross-link interference. Cross-link interference may be more common at cell edges between neighboring cells and may result in a degraded signal to interference noise ratio (SINR) for the victim UE.

As shown in FIG. 3B, in another scenario, a single BS 110 may provide coverage to both first UE 120-1 and second UE 120-2. For example, BS 110 may provide full-duplex capability that enables first UE 120-1 to transmit on an uplink concurrently with second UE 120-2 receiving on a downlink. In this case, an uplink transmission by first UE 120-1 in an uplink symbol scheduled concurrently with a downlink transmission to second UE 120-2 in a downlink symbol may result in second UE 120-2 experiencing in cross-link interference.

First UE 120-1 may be configured with a transmit power control procedure that enables UE 120 to adjust an uplink transmit power based at least in part on a physical uplink shared channel (PUSCH) transmit power, a maximum configured output power, a target received power at BS 110, and/or other factors. However, cross-link interference measurements may not be included in the transmit power control procedure. Thus, some aspects described herein enable a victim UE to provide information identifying a cross-link interference strength via a sidelink to enable an aggressor UE to perform improved transmit power control. In this way, the victim UE and the aggressor UE enable a reduced likelihood of interference, thereby improving network communication.

As indicated above, FIGS. 3A and 3B are provided as an example. Other examples may differ from what is described with respect to FIGS. 3A and 3B.

Figure 4A:
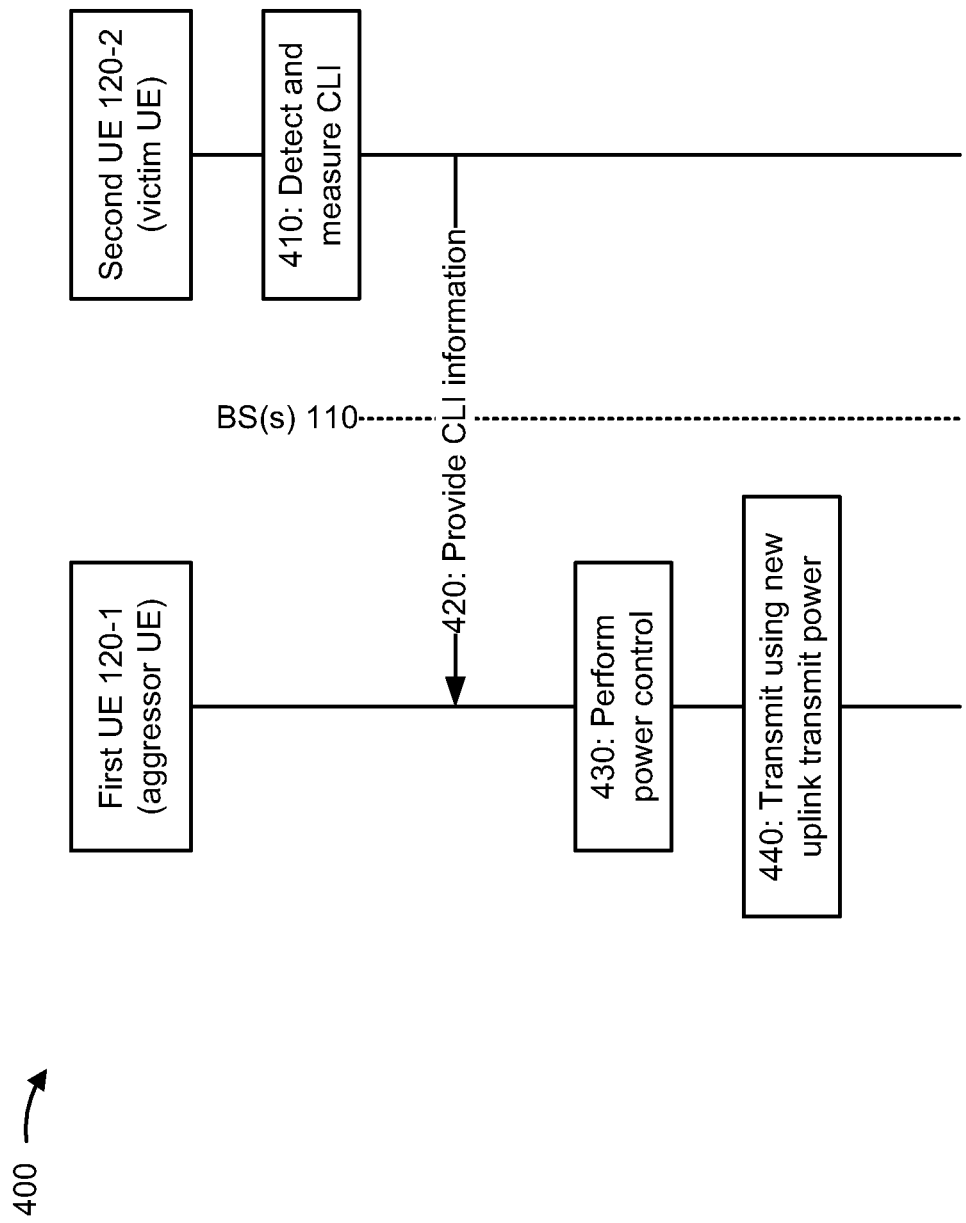
FIGS. 4A-4C are diagrams illustrating examples of uplink power control for cross-link interference in sidelink communication scenarios, in accordance with various aspects of the present disclosure.
Figure 4B:
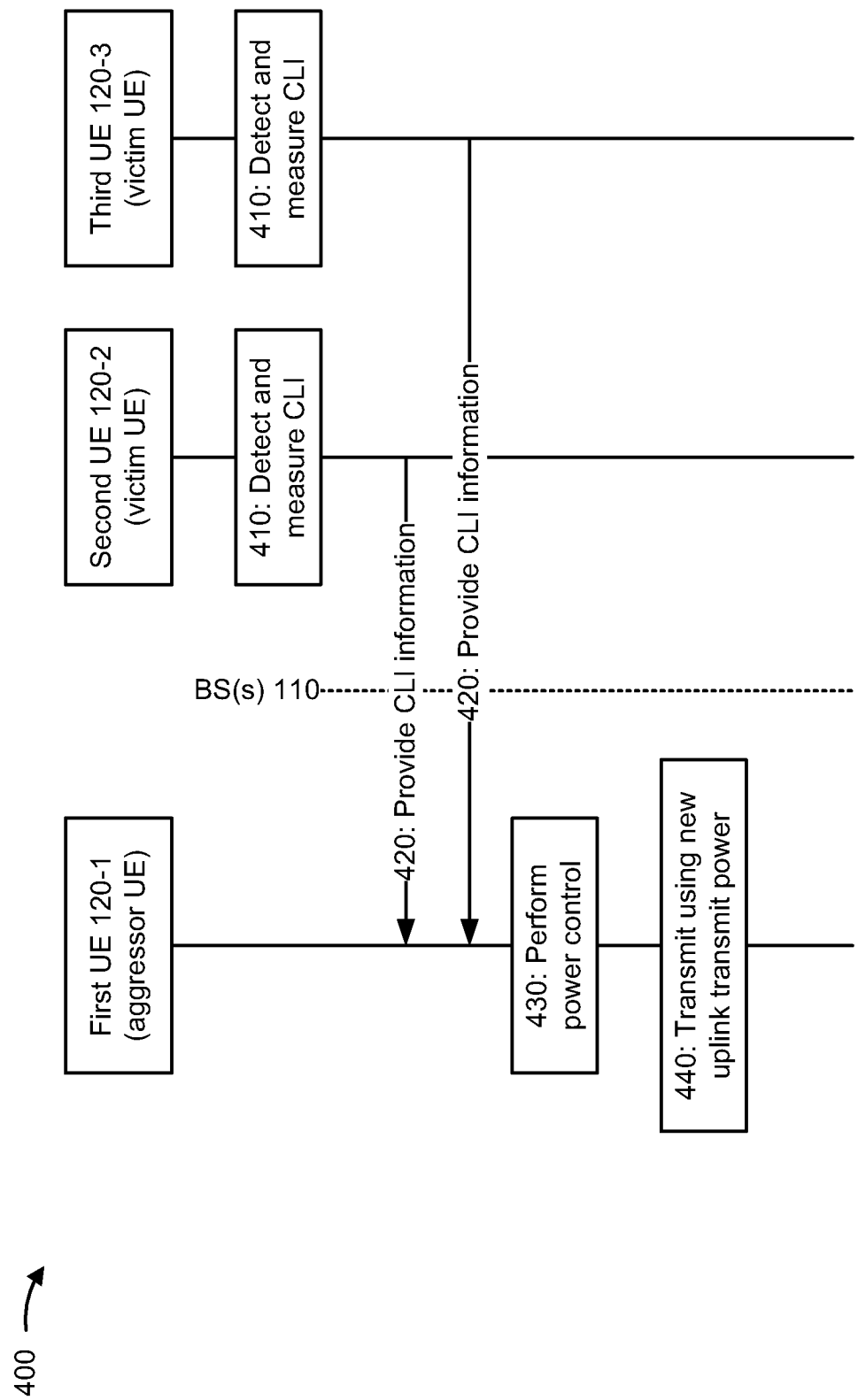
Figure 4C:
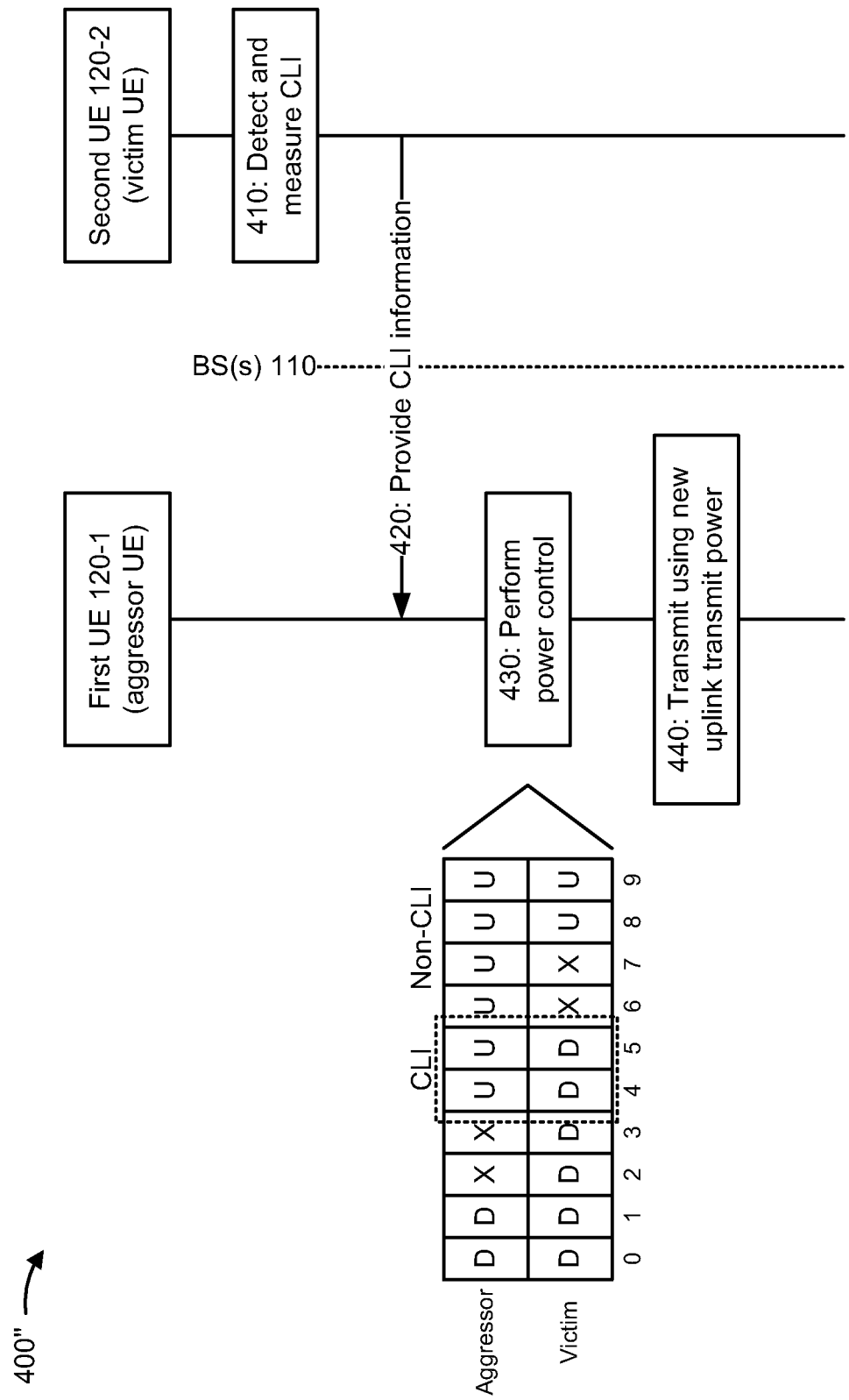

FIGS. 4A-4C are diagrams illustrating examples 400/400'/400" of uplink power control for cross-link interference in sidelink communication scenarios, in accordance with various aspects of the present disclosure. As shown in FIG. 4A, example 400 may include a first UE 120-1 (e.g., that is an aggressor UE in a cross-link interference scenario) and a second UE 120-2 (e.g., that is a victim UE in the cross-link interference scenario).

As shown in FIG. 4A, and by reference number 410, second UE 120-2 may detect and measure cross-link interference. For example, first UE 120-1 may transmit on an uplink during a period when second UE 120-2 is concurrently receiving on a downlink, which may result in second UE 120-2 experiencing cross-link interference. In some aspects, second UE 120-2 may measure a particular characteristic of a network to determine a cross-link interference strength. For example, second UE 120-2 may determine a reference signal received power (RSRP) of, for example, a sounding reference signal (SRS). Additionally, or alternatively, second UE 120-2 may determine a received signal strength indicator (RSSI), and/or the like. In some aspects, second UE 120-2 may generate a layer 3 (L3) measurement report for the SRS RSRP and/or the RSSI. In some aspects, as shown in FIG. 4B, and in example 400', a plurality of victim UEs may detect and measure cross-link interference. For example, both a second UE 120-2 and a third UE 120-3 may detect and measure cross-link interference.

As further shown in FIG. 4A, and by reference number 420, first UE 120-1 may receive cross-link interference information from second UE 120-2 identifying a cross-link interference strength. For example, second UE 120-2 may transmit information identifying the cross-link interference strength via a sidelink connection with first UE 120-1. Additionally, or alternatively, second UE 120-2 may transmit the information via one or more BSs 110, which may relay the information to first UE 120-1. In some aspects, as shown in FIG. 4B, first UE 120-1 may receive a plurality of reports regarding a cross-link interference strength. For example, first UE 120-1 may receive first cross-link interference information identifying a first cross-link interference strength and second cross-link interference information identifying a second cross-link interference strength.

As further shown in FIG. 4A, and by reference number 430, first UE 120-1 may perform a power control procedure. For example, first UE 120-1 may determine an uplink transmit power based at least in part on the cross-link interference strength. In some aspects, first UE 120-1 may reduce the transmission power to cause a reduction in cross-link interference. For example, first UE 120-1 may reduce the uplink transmit power based at least in part on the cross-link interference strength to ensure that the cross-link interference strength on subsequent uplink transmissions is less than a threshold. In this case, first UE 120-1 may change from using a first transmit power control formula, which may take the form:

$$P_{PUSCH}(j,q,l) = \min\{P_{CMAX}, P_{O\_PUSCH}(j) + 10 \cdot \log_{10}(2^u \cdot M_{RB}^{PUSCH}) + \alpha(j) \cdot PL(q) + \Delta_{TF} + f(l)\} \quad (1)$$

where $P_{PUSCH}$ is the uplink transmit power (e.g., for a PUSCH transmission), $P_{CMAX}$ is a maximum output power configured by a BS 110 for a cell in which first UE 120-1 is operating, $P_{O\_PUSCH}$ is a target received power at the BS 110 normalized by a bandwidth of the PUSCH transmission, u is a subcarrier spacing configuration, M is the bandwidth of the PUSCH transmission in terms of a quantity of resource blocks, a is a fractional path-loss compensation coefficient, PL is a downlink pathloss estimate determined by first UE 120-1, ATF is a parameter relating to the modulation and coding scheme and code rate for the PUSCH transmission, f is a closed-loop power control parameter, and q, j, and l are configurable parameters. Further, first UE 120-1 may change to using a second transmit power control formula, which may take the form:

$$P'_{PUSCH}(j,q,l) = P_{PUSCH}(j,q,l) - \min\{0, \tau \cdot (P_{CLI,ref} - P_{CLI})\} \quad (2)$$

where $P'_{PUSCH}$ is the uplink transmit power, $P_{CLI}$ is the cross-link interference strength, $P_{CLI,ref}$ is a reference cross-link interference strength (e.g., for converting an absolute power of the cross-link interference strength to a decibel (dB) value), and τ is a scaling factor. In this case, the second transmit power control formula results in a determined uplink transmit power that is less than or equal to an uplink transmit power determined using the first transmit power control formula. Additionally, or alternatively, first UE 120-1 may adjust one or more parameters based at least in part on the presence of cross-link interference, such as the path loss scaling factor (α), the target received power ($P_{O\_PUSCH}$), or the modulation and coding scheme parameter ($\Delta_{TF}$) (e.g., which may reduce channel throughput by reducing a modulation and coding scheme and/or increasing a code rate) to reduce an uplink transmit power calculated using the first and/or second power control formula, thereby reducing an uplink transmit power to reduce cross-link interference.

In some aspects, first UE 120-1 may determine a scheduling request indicator (SRI) in connection with determining the uplink transmit power. For example, first UE 120-1 may determine the SRI of second UE 120-2 to enable first UE 120-1 to identify a subsequent uplink transmission that is to cause subsequent cross-link interference for second UE 120-2 (and adjust the subsequent uplink transmit power of the subsequent uplink transmission). In this case, first UE 120-1 may adjust the uplink transmit power for each uplink transmission that is associated with the same SRI as is reported by second UE 120-2 in connection with reporting the cross-link interference strength.

In some aspects, first UE 120-1 may determine an uplink transmit power based at least in part on receiving information identifying a plurality of cross-link interference strengths from a plurality of UEs 120, as shown in FIG. 4B. For example, first UE 120-1 may select a strongest cross-link interference strength reported by a UE 120 and may adjust the uplink transmit power based at least in part on the strongest cross-link interference strength. Alternatively, first UE 120-1 may determine an average cross-link interference strength based at least in part on the plurality of cross-link interference strengths and may adjust the uplink transmit power based at least in part on the average cross-link interference strength. Additionally, or alternatively, first UE 120-1 may select a subset of reported cross-link interference strengths and adjust the uplink transmit power based at least in part on the subset of reported cross-link interference strengths. For example, first UE 120-1 may select one or more cross-link interference strengths reported by one or more UEs 120 with a highest priority with regard to a scheduled downlink transmission. In other words, first UE 120-1 may adjust the uplink transmit power to ensure another UE 120 that is to receive or that has received a high priority downlink transmission, such as a downlink transmission of an ultra-reliable low latency communication (URLLC) service, does not experience a threshold level of cross-link interference in a subsequent symbol.

In some aspects, first UE 120-1 may determine an uplink transmit power control for a plurality of sets of symbols. For example, as shown in FIG. 4C, a first set of symbols 4 and 5 may have uplink transmissions by first UE 120-1 and downlink transmissions to second UE 120-2 resulting in a cross-link interference scenario, symbols 6 and 7 may have uplink transmission by first UE 120-1 and flexible transmission or reception by second UE 120-2 resulting in a non-cross-link interference scenario, and symbols 8 and 9 may have uplink transmission by first UE 120-1 and uplink transmission by second UE 120-2 resulting in a non-cross link interference scenario. In this case, first UE 120-1 may determine to perform separate power control for different subsets of symbols. For example, first UE 120-1 may perform a first power control procedure to avoid cross-link interference in symbols 4 and 5 and a second power control procedure (e.g., to achieve a higher uplink transmit power) in symbols 6 to 9. In some aspects, first UE 120-1 may perform the same power control procedure across each subset of symbols, resulting in a single uplink transmit power to avoid cross-link interference applied across symbols 4 to 9. In this case, first UE 120-1 may maintain phase continuity for symbols 4 to 9 by using a single power control procedure. In some aspects, first UE 120-1 may apply a transmit power control procedure to a plurality of cross-link interference strengths across a plurality of sets of symbols. For example, first UE 120-1 may select a strongest cross-link interference strength for a set of symbols and adjust an uplink transmit power for the plurality of sets of symbols based at least in part on the strongest cross-link interference strength. Additionally, or alternatively, first UE 120-1 may select, for determining an uplink transmit power, an average cross-link interference strength across the plurality of sets of symbols or select one or more cross-link interference strengths associated with, for example, a high priority type of transmission.

With reference to FIGS. 4A-4C, and as shown by reference number 440, first UE 120-1 may transmit using a new uplink transmit power. For example, based at least in part on determining an uplink transmit power to avoid cross-link interference, first UE 120-1 may transmit, on an uplink, using the uplink transmit power. In this way, first UE 120-1 and second UE 120-2 enable reduced cross-link interference, thereby improving network communication.

As indicated above, FIGS. 4A-4C are provided as an example. Other examples may differ from what is described with respect to FIGS. 4A-4C.

Figure 5:
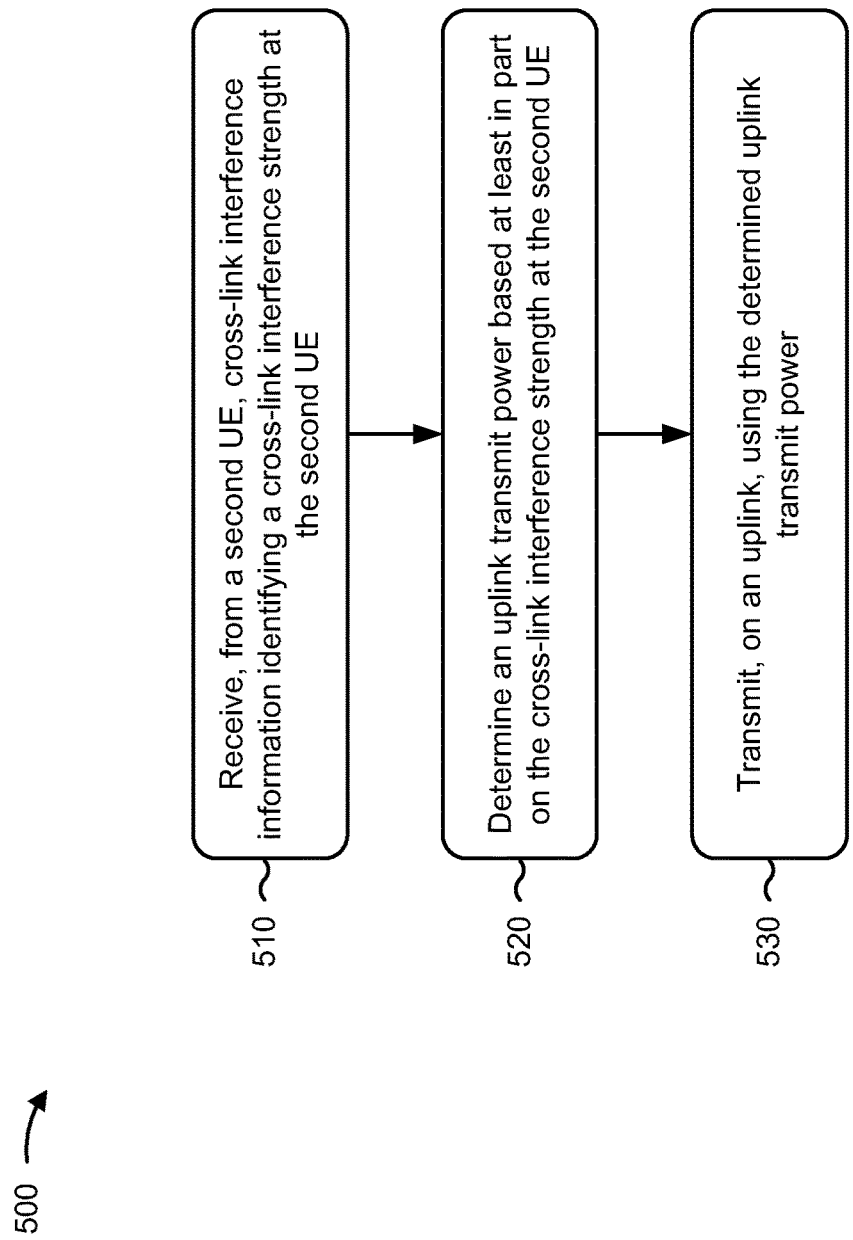
FIG. 5 is a diagram illustrating an example process performed, for example, by a user equipment, in accordance with various aspects of the present disclosure.

FIG. 5 is a diagram illustrating an example process 500 performed, for example, by a first UE, in accordance with various aspects of the present disclosure. Example process 500 is an example where the first UE (e.g., UE 120 and/or the like) performs operations associated with uplink power control for cross-link interference scenarios.

As shown in FIG. 5, in some aspects, process 500 may include receiving, from a second UE, cross-link interference information identifying a cross-link interference strength at the second UE (block 510). For example, the first UE (e.g., using antenna 252, DEMOD 254, MIMO detector 256, receive processor 258, controller/processor 280, memory 282, and/or the like) may receive, from a second UE, cross-link interference information identifying a cross-link interference strength at the second UE, as described above with reference to FIGS. 4A-4C.

As further shown in FIG. 5, in some aspects, process 500 may include determining an uplink transmit power based at least in part on the cross-link interference strength at the second UE (block 520). For example, the first UE (e.g., using controller/processor 280, transmit processor 264, TX MIMO processor 266, MOD 254, antenna 252, and/or the like) may determine an uplink transmit power based at least in part on the cross-link interference strength at the second UE, as described above with reference to FIGS. 4A-4C.

As further shown in FIG. 5, in some aspects, process 500 may include transmitting, on an uplink, using the determined uplink transmit power (block 530). For example, the first UE (e.g., using controller/processor 280, transmit processor 264, TX MIMO processor 266, MOD 254, antenna 252, and/or the like) may transmit, on an uplink, using the determined uplink transmit power, as described above with reference to FIGS. 4A-4C.

Process 500 may include additional aspects, such as any single aspect or any combination of aspects described below and/or in connection with one or more other processes described elsewhere herein.

In a first aspect, receiving the cross-link interference information includes receiving the cross-link interference information directly from the second UE.

In a second aspect, alone or in combination with the first aspect, receiving the cross-link interference information includes receiving the cross-link interference information via a base station.

In a third aspect, alone or in combination with one or more of the first and second aspects, determining the uplink transmit power includes determining the uplink transmit power for one or more symbols during which the first UE is to transmit on the uplink and the second UE is to receive on a downlink.

In a fourth aspect, alone or in combination with one or more of the first through third aspects, determining the uplink transmit power includes determining the uplink transmit power based at least in part on a power control function, the cross-link interference strength, a reference cross-link interference strength, and a scaling factor.

In a fifth aspect, alone or in combination with one or more of the first through fourth aspects, determining the uplink transmit power includes determining the uplink transmit power based at least in part on a transmission parameter selected based at least in part on the cross-link interference strength, and the transmission parameter is at least one of: a path loss scaling factor parameter, a channel throughput parameter, or a target received power parameter.

In a sixth aspect, alone or in combination with one or more of the first through fifth aspects, determining the uplink transmit power includes determining a scheduling request indicator for an uplink beam that causes cross-link interference at the second UE and determining the uplink transmit power for the uplink beam based at least in part on determining the scheduling request indicator for the uplink beam.

In a seventh aspect, alone or in combination with one or more of the first through sixth aspects, determining the uplink transmit power includes receiving one or more other reports of cross-link interference at one or more third UEs and determining the uplink transmit power based at least in part on a strongest cross-link interference strength reported by the second UE and the one or more third UEs.

In an eighth aspect, alone or in combination with one or more of the first through seventh aspects, determining the uplink transmit power includes receiving one or more other reports of cross-link interference at one or more third UEs and determining the uplink transmit power based at least in part on an average cross-link interference strength reported by the second UE and the one or more third UEs.

In a ninth aspect, alone or in combination with one or more of the first through eighth aspects, determining the uplink transmit power includes receiving one or more other reports of cross-link interference at one or more third UEs and determining the uplink transmit power based at least in part on at least one cross-link interference strength reported by the second UE and the one or more third UEs and based at least in part on relative priorities of the second UE and the one or more third UEs.

In a tenth aspect, alone or in combination with one or more of the first through ninth aspects, determining the uplink transmit power includes identifying a subset of symbols for which cross-link interference is generated for the second UE and determining the uplink transmit power for the subset of symbols.

In an eleventh aspect, alone or in combination with one or more of the first through tenth aspects, determining the uplink transmit power includes determining the uplink transmit power for a set of symbols that includes a subset of symbols for which cross-link interference is generated for the second UE and that includes one or more other symbols.

In a twelfth aspect, alone or in combination with one or more of the first through eleventh aspects, determining the uplink transmit power includes identifying a plurality of subsets of symbols associated with different cross-link interference at the second UE and determining the uplink transmit power based at least in part on a highest cross-link strength in a subset of symbols of the plurality of subsets of symbols.

In a thirteenth aspect, alone or in combination with one or more of the first through twelfth aspects, determining the uplink transmit power includes identifying a plurality of subsets of symbols associated with different cross-link interference at the second UE and determining the uplink transmit power based at least in part on an average cross-link strength across the plurality of subsets of symbols.

In a fourteenth aspect, alone or in combination with one or more of the first through thirteenth aspects, determining the uplink transmit power includes identifying a plurality of subsets of symbols associated with different cross-link interference at the second UE and determining the uplink transmit power based at least in part on a particular cross-link strength in a subset of symbols, of the plurality of subsets of symbols, associated with a particular type of uplink transmission.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment (UE), comprising:
   receiving, from a second UE, cross-link interference information identifying a cross-link interference strength at the second UE;
   determining an uplink transmit power based at least in part on the cross-link interference strength at the second UE, wherein determining the uplink transmit power comprises:
      identifying a plurality of subsets of symbols associated with different cross-link interference at the second UE; and
      determining the uplink transmit power based at least in part on each cross-link interference strength in each subset of symbols, of the plurality of subsets of symbols, associated with a particular type of uplink transmission; and transmitting, on an uplink, using the determined uplink transmit power.

2. The method of claim 1, wherein receiving the cross-link interference information comprises:

receiving the cross-link interference information directly from the second UE.

3. The method of claim 1, wherein receiving the cross-link interference information comprises:

receiving the cross-link interference information via a base station.

4. The method of claim 1, wherein determining the uplink transmit power comprises:

determining the uplink transmit power for one or more symbols during which the first UE is to transmit on the uplink and the second UE is to receive on a downlink.

5. The method of claim 1, wherein determining the uplink transmit power comprises:

determining the uplink transmit power based at least in part on a power control function, the cross-link interference strength, a reference cross-link interference strength, and a scaling factor.

6. The method of claim 1, wherein determining the uplink transmit power comprises:

determining the uplink transmit power based at least in part on a transmission parameter selected based at least in part on the cross-link interference strength, and wherein the transmission parameter is at least one of:
a path loss scaling factor parameter,
a channel throughput parameter, or
a target received power parameter.

7. The method of claim 1, wherein determining the uplink transmit power comprises:

determining a scheduling request indicator for an uplink beam that causes cross-link interference at the second UE; and determining the uplink transmit power for the uplink beam based at least in part on determining the scheduling request indicator for the uplink beam.

8. The method of claim 1, further comprising:

receiving one or more other reports of cross-link interference at one or more third UEs; and wherein determining the uplink transmit power comprises:

determining the uplink transmit power based at least in part on a strongest cross-link interference strength reported by the second UE and the one or more third UEs.

9. The method of claim 1, further comprising:

receiving one or more other reports of cross-link interference at one or more third UEs; and wherein determining the uplink transmit power comprises:

determining the uplink transmit power based at least in part on an average cross-link interference strength reported by the second UE and the one or more third UEs.

10. The method of claim 1, further comprising:

receiving one or more other reports of cross-link interference at one or more third UEs; and wherein determining the uplink transmit power comprises:

determining the uplink transmit power based at least in part on at least one cross-link interference strength reported by the second UE and the one or more third UEs and based at least in part on relative priorities of the second UE and the one or more third UEs.

11. The method of claim 1, wherein determining the uplink transmit power comprises:

identifying a subset of symbols, of the plurality of subsets of symbols, for which cross-link interference is generated for the second UE; and determining the uplink transmit power for the subset of symbols.

12. The method of claim 1, wherein determining the uplink transmit power comprises:

determining the uplink transmit power for a set of symbols that includes a subset of symbols, of the plurality of subsets of symbols, for which cross-link interference is generated for the second UE and that includes one or more other symbols.

13. The method of claim 1, wherein determining the uplink transmit power comprises:

determining the uplink transmit power based at least in part on an average cross-link strength across the each subset of symbols, of the plurality of subsets of symbols.

14. The method of claim 1, wherein determining the uplink transmit power comprises:

determining the uplink transmit power for each uplink transmission that is associated with a same scheduling request indicator reported by the second UE in connection with reporting the cross-link interference strength.

15. A first user equipment (UE) for wireless communication, comprising:

a memory; and one or more processors operatively coupled to the memory, the memory and the one or more processors configured to:

receive, from a second UE, cross-link interference information identifying a cross-link interference strength at the second UE;

determine an uplink transmit power based at least in part on the cross-link interference strength at the second UE, wherein the one or more processors, when determining the uplink transmit power, are further configured to:

identify a plurality of subsets of symbols associated with different cross-link interference at the second UE;

determine the uplink transmit power based at least in part on each cross-link interference strength in each subset of symbols, of the plurality of subsets of symbols, associated with a particular type of uplink transmission; and transmit, on an uplink, using the determined uplink transmit power.

16. The first UE of claim 15, wherein the one or more processors, to receive the cross-link interference information, are configured to:

receive the cross-link interference information directly from the second UE.

17. The first UE of claim 15, wherein the one or more processors, to receive the cross-link interference information, are configured to:

receive the cross-link interference information via a base station.

18. The first UE of claim 15, wherein the one or more processors, to determine the uplink transmit power, are configured to:

determine the uplink transmit power for one or more symbols during which the first UE is to transmit on the uplink and the second UE is to receive on a downlink.

19. The first UE of claim 15, wherein the one or more processors, to determine the uplink transmit power, are configured to:
   determine the uplink transmit power based at least in part on a power control function, the cross-link interference strength, a reference cross-link interference strength, and a scaling factor.

20. The first UE of claim 15, wherein the one or more processors, to determine the uplink transmit power, are configured to:
   determine the uplink transmit power based at least in part on a transmission parameter selected based at least in part on the cross-link interference strength, and
   wherein the transmission parameter is at least one of:
      a path loss scaling factor parameter,
      a channel throughput parameter, or
      a target received power parameter.

21. The first UE of claim 15, wherein the one or more processors, to determine the uplink transmit power, are configured to:
   determine a scheduling request indicator for an uplink beam that causes cross-link interference at the second UE; and
   determine the uplink transmit power for the uplink beam based at least in part on determining the scheduling request indicator for the uplink beam.

22. The first UE of claim 15, wherein the one or more processors are further configured to:
   receive one or more other reports of cross-link interference at one or more third UEs; and
   wherein the one or more processors, to determine the uplink transmit power, are configured to:
      determine the uplink transmit power based at least in part on a strongest cross-link interference strength reported by the second UE and the one or more third UEs.

23. The first UE of claim 15, wherein the one or more processors are further configured to:
   receive one or more other reports of cross-link interference at one or more third UEs; and
   wherein the one or more processors, to determine the uplink transmit power, are configured to:
      determine the uplink transmit power based at least in part on an average cross-link interference strength reported by the second UE and the one or more third UEs.

24. The first UE of claim 15, wherein the one or more processors are further configured to:
   receive one or more other reports of cross-link interference at one or more third UEs; and
   wherein the one or more processors, to determine the uplink transmit power, are configured to:
      determine the uplink transmit power based at least in part on at least one cross-link interference strength reported by the second UE and the one or more third UEs and based at least in part on relative priorities of the second UE and the one or more third UEs.

25. The first UE of claim 15, wherein the one or more processors, to determine the uplink transmit power, are configured to:
   identify a subset of symbols, of the plurality of subsets of symbols, for which cross-link interference is generated for the second UE; and
   determine the uplink transmit power for the subset of symbols.

26. The first UE of claim 15, wherein the one or more processors, to determine the uplink transmit power, are configured to:
   determine the uplink transmit power for a set of symbols that includes a subset of symbols, of the plurality of subsets of symbols, for which cross-link interference is generated for the second UE and that includes one or more other symbols.

27. The first UE of claim 15, wherein the one or more processors, to determine the uplink transmit power, are configured to:
   determine the uplink transmit power based at least in part on an average cross-link strength across the each subset of symbols, of the plurality of subsets of symbols.

28. A non-transitory computer-readable medium storing one or more instructions for wireless communication, the one or more instructions comprising:
   one or more instructions that, when executed by one or more processors of a first user equipment (UE), cause the one or more processors to:
      receive, from a second UE, cross-link interference information identifying a cross-link interference strength at the second UE;
      determine an uplink transmit power based at least in part on the cross-link interference strength at the second UE, wherein the one or more instructions that cause the one or more processors to determine the uplink transmit power, further cause the one or more processors to:
         identify a plurality of subsets of symbols associated with different cross-link interference at the second UE; and
         determine the uplink transmit power based at least in part on each cross-link interference strength in each subset of symbols, of the plurality of subsets of symbols, associated with a particular type of uplink transmission; and
      transmit, on an uplink, using the determined uplink transmit power.

29. The non-transitory computer-readable medium of claim 28, wherein the one or more instructions, that cause the one or more processors to receive the cross-link interference information, cause the one or more processors to:
   receive the cross-link interference information directly from the second UE.

30. The non-transitory computer-readable medium of claim 28, wherein the one or more instructions, that cause the one or more processors to receive the cross-link interference information, cause the one or more processors to:
   receive the cross-link interference information via a base station.

31. The non-transitory computer-readable medium of claim 28, wherein the one or more instructions, that cause the one or more processors to determine the uplink transmit power, cause the one or more processors to:
   determine the uplink transmit power for one or more symbols during which the first UE is to transmit on the uplink and the second UE is to receive on a downlink.

32. An apparatus for wireless communication, comprising:
   means for receiving, from a second UE, cross-link interference information identifying a cross-link interference strength at the second UE;
   means for determining an uplink transmit power based at least in part on the cross-link interference strength at the second UE, wherein the means for determining the uplink transmit power further comprise:
means for identifying a plurality of subsets of symbols associated with different cross-link interference at the second UE; and
means for determining the uplink transmit power based at least in part on each cross-link interference strength in each subset of symbols, of the plurality of subsets of symbols, associated with a particular type of uplink transmission; and
means for transmitting, on an uplink, using the determined uplink transmit power.

* * * * *